3,307,193

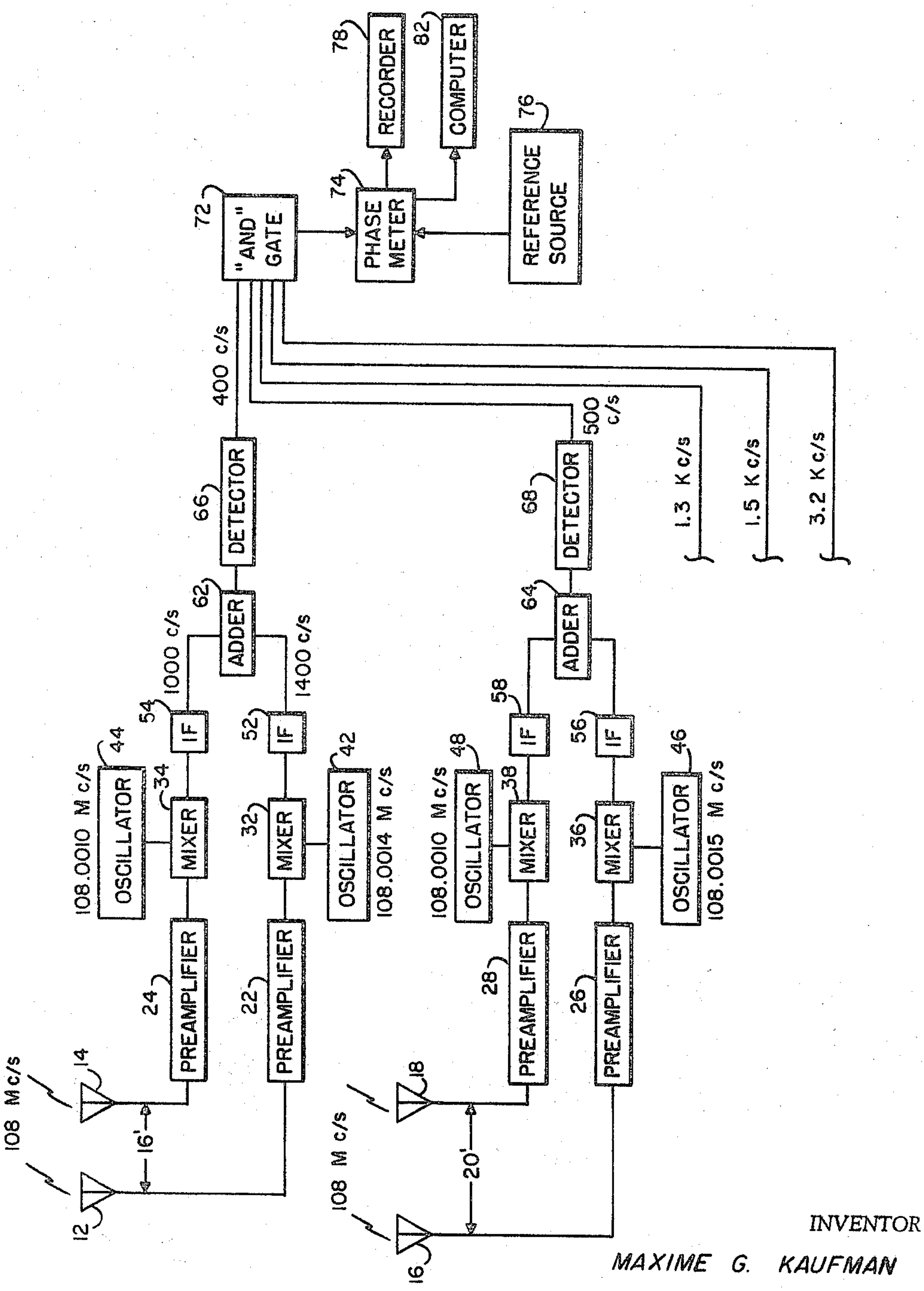
INVENTOR
MAXIME G. KAUFMAN
BY James G. Murray
R. H. Sciascia ATTORNEYS United States Patent Office 3,307,193
Patented Feb. 28, 1967

RADIO FREQUENCY INTERFEROMETER PHASE CHANNEL COMBINER WITH HETERODYNING AT PREDETECTION LEVEL

Maxime G. Kaufman, Camp Springs, Md., assignor to the United States of America as represented by the Secretary of the Navy Filed Feb. 19, 1965, Ser. No. 434,146
8 Claims. (Cl. 343—113)

The invention described herein may be manufactured and used by or for the Government of the United States of America for governmental purposes without the payment of any royalties thereon or therefor.

The present invention relates generally to improvements in radio interferometer systems and the like and more particularly to new and improved space surveillance systems wherein the base line proportioning technique is introduced at the radio frequency heterodyning stage.

Recent technological advances have resulted in an ever increasing number of man-made satellites being placed in orbit around the earth. For obvious reasons it became desirable to provide systems which would detect and monitor the orbiting satellites which pass over the continental United States. One of these systems is the Naval Space Surveillance System which is described in U.S. Patent No. 3,122,741, issued to Roger L. Easton on February 25, 1964, and in an article by Philip J. Klass titled, "Spasur Net Giving Vital Norad Coverage," which appeared in the November 26, 1962, issue of Aviation Week and Space Technology.

As described more fully in the mentioned patent and magazine article, in the Naval Space Surveillance System a "fence" of C.W. energy is erected across the southern half of the United States. An orbiting satellite upon crossing through this "fence" reflects a portion of this C.W. energy which is received at receiving stations by a plurality of antennas that are separated by different distances. The plurality of antennas is utilized to resolve the ambiguity which is present in a determination of the satellite location by analysis of the phase of the C.W. energy received by the antennas.

The present invention is an improvement of the prior art phase analysis portion of the Naval Space Surveillance System, which portion is described in more detail in application Serial Number 277,059, which was filed on April 30, 1963, in the names of Maxime G. Kaufman and Donald W. Lynch, now Patent No. 3,217,326, which issued November 9, 1965. In the prior system, the signals received by the various antennas are combined to form, after detection, a plurality of 1000 c./s. signals of different phase. The 1000 c./s. signals are, in the post detection stage, further heterodyned to form signals at frequencies which are proportional to the baseline distances between the various antennas.

The prior system was advantageous in that a uniformity of equipment was possible in the RF, IF and detector stages. In other words, identical equipment could be used in the various channels associated with the antenna pairs to reduce the RF to the 1000 c./s. detector output. However, in the prior system, because of the numerous pre- and post-detection stages made necessary by the uniformity of pre-detection components, some degradation of the signal to noise ratio occurs in the late stage signals, i.e. wherein the frequency is related to the baseline distances.

The general purpose of this invention is to provide a general purpose radio interferometer system suitable for space surveillance, which embraces all the advantages of similar prior systems but possesses none of the afore-described disadvantages. To attain this, the present invention contemplates circuitry for combining and frequency reducing the signals from antenna pairs with a minimum of heterodyning.

It is, therefore, an object of this invention to provide a radio interferometer system with an improved signal to noise ratio.

It is also an object of this invention to provide a radio interferometer system with an improved signal to noise ratio and, when used in a space surveillance system, with an increase range of satellite detection.

Another object of this invention is to provide a radio interferometer system which includes a minimum of heterodyning stages.

Yet another object of the present invention is to provide a radio interferometer system, suitable for space surveillance, which includes a minimum of heterodyning stages, has an improved signal to noise ratio and produces an unambiguous indication of the direction of a signal source.

Still another object of this invention is to provide a radio interferometer system, suitable for space surveillance, which includes a minimum of cross-talk between channels and which improves the signal to noise ratio of each channel.

The exact nature of this invention as well as other objects and advantages thereof will be readily apparent from consideration of the following specification relating to the annexed drawing in which the figure illustrates an embodiment of the invention in block diagram form.

Referring now to the drawing, the invention is illustrated as being incorporated in a radio interferometer system which provides an unambiguous indication of the direction of a satellite. It should be realized that, although not necessarily so limited in its utility, the present invention is contemplated as being primarily an improvement of the interferometer system described in Patent Number 3,217,326, previously mentioned. Further, both for purposes of clarity and continuity, the present invention will be described in terms of quantities which are consistent with the typical quantities used in the previous application.

In addition to the illustrated antennas 12 and 14, which are 16 feet apart, and the antennas 16 and 18, which are 20 feet apart, the interferometer system includes other antenna pairs which are separated by baseline distances of 52, 60 and 128 feet. One antenna, such as 14, may be but is not necessarily common to all of the antenna pairs. The antennas receive energy reflected by a satellite which passes through the system "fence," the reflected energy typically being at a frequency of 108 mc./s. The antennas 12, 14, 16 and 18 are connected to pre-amplifiers 22, 24, 26 and 28 which are in turn connected to mixers 32, 34, 36 and 38. Mixer 32 is also connected to oscillator 42 which produces a signal at a frequency of 108.0014 mc./s. Mixer 34 is also connected to oscillator 44 which produces a signal at a frequency of 108.0010 mc./s. Similarly the mixers 36 and 38 are connected to oscillators 46 and 48 which respectively produce signals at frequencies of 108.0015 and 108.0010 mc./s. Oscillators 44 and 48 can, of course, be combined in an obviously expedient manner if desired. The desired products of the mixers are passed by the IF detection systems 52, 54, 56 and 58 to the adders 62 and 64 which are in turn connected to the detectors 66 and 68. These detectors, as well as the detectors in the three channels not illustrated in detail, are connected to coincidence or "AND" gate 72. Phase meter 74 is connected to the output of gate 72, reference source 76, recorder 78 and computer 82. Gate 72, phase meter 74 and reference source 76 are analogous, in an obvious manner, to the function and structure of components 35–49 in Patent Number 3,217,-

326. This analogousness will, of course, require coherency between the oscillators 42, 44, 46 and 48 and the reference source 76. In other words, for the frequency values described and by procedures well known in the art of synthesizing signals, the signals from components 42, 44, 46, 48 and 76 are "locked" together and 100 times a second are in a predetermined phase relationship (i.e. typically nulled in a positive-going direction). The 100 times a second frequency of the known phase relationship is, of course, the largest common frequency divisor of the frequencies of the signals from these components.

The operation of the invention will now be described.

When a satellite crosses the 108 mc./s. C.W. "fence" erected by the non-illustrated transmitters of the system, the satellite reflects some of the "fence" energy which is received by the antenna pairs 12, 14 and 16, 18 and the three non-illustrated antenna pairs. Energy received by antennas 12 and 14, which are 16 feet apart, after amplification in components 22 and 24, is heterodyned in mixers 32 and 34 with the 108.0014 and 108.0010 mc./s. signals from oscillators 42 and 44 respectively. The products of the mixing include 1400 and 1000 c./s. components which are detected and passed by IF systems 52 and 54. These 1400 and 1000 c./s. components are further processed in adder 62 and a 400 c./s. resultant information signal is detected by detector 66 and applied to "AND" gate 72, which will be understood to include "0" crossing pulse generators and to be identical to the components 37–42 in the already mentioned Patent No. 3,217,326. The channel which includes antenna pair 16 and 18, separated by a distance of 20 feet, applies a 500 c./s. information signal to "AND" gate 72, the 500 c./s. signal being produced in a manner obviously analogous to the production of the 400 c./s. signal, it being noted in particular that oscillator 46 produces a 108.0015 mc./s. signal. The three other channels, which are not illustrated, wherein the antennas are separated by baseline distances of 52, 60 and 128 feet, also apply 1.3, 1.5 and 3.2 kc./s. information signals to gate 72, these signals being produced in a manner analogous to the production of the 400 and 500 c./s. signals. It is emphasized that the herein described antenna baseline distances, the frequencies and even the single stage heterodyning technique are merely illustrative and that other combinations of distances and frequencies, as well as the double-heterodyning technique, can obviously be used according to the desire of the user.

Persons skilled in the electronic arts will recognize that the signals applied to "AND" gate 72 are of phases which are related to the orientation of the satellite relative to the antenna pairs. As discussed more fully in the previously mentioned Patent No. 3,217,326, because of coherency throughout the system, the five signals will coincide at the zero crossover, and thereby cause gate 72 to produce an output, at a time relative to the signal from reference source 76 which is unambiguously indicative of the satellite orientation with respect to the receiving site. The time relationship between the signals from gate 72 and source 76 is measured by phase meter 74 which can be calibrated to indicate the satellite direction in degrees of elevation. If desired, the output of phase meter 74 can be recorded on a recorder 78 for real time observation. Additionally, the output of phase meter 74 can be fed to a computer 82, typically on IBM Model 7090, which provides information concerning the orbit of the satellite.

It will be evident that there has been disclosed a radio interferometry system which produces an unambiguous indication of the direction of a signal source, such as a reflecting satellite crossing the "fence" of a space surveillance system. The disclosed invention is further advantageous in that a minimum of heterodyning stages are used with a resultant improvement in the signal to noise ratio of both the baseline related frequency signals and of the resultant signal which is indicative of the orientation of the satellite. Yet another advantage realized by the disclosed invention is the reduction in circuit complexity and the accompanying advantages of reduction in cost, space requirement and maintenance. Still another advantage of the disclosed system is the reduction of crosstalk between channels. This reduction occurs because in the present invention each channel uses a different IF, thereby greatly improving cross-talk isolation. In contrast, the previous system of Serial Number 277,059 uses the same IF in all channels, a condition conducive to crosschannel coupling or cross-talk.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. In a radio interferometer system for providing an unambiguous indication of the direction of a signal source comprising:
   - a plurality of antenna pairs, each pair having a different baseline distance;
   - a plurality of signal channels, each channel being connected to a different antenna pair and comprising:
     - two mixers, each coupled to a different antenna of said pair;
     - two phase coherent oscillators connected to said mixers and producing signals that are separated in frequency by a frequency difference which is substantially proportional to the baseline distance between said antenna pair;
     - an adder coupled to receive the output of said two mixers; and
     - a detector connected to said adder to produce an output signal related in phase to energy received by said antennas and in frequency to the frequency difference between said oscillator signals;
   - coincidence means connected to the output of said detectors in said plurality of channels for producing a signal when said outputs of said detectors achieve a selected phase relationship;
   - reference signal source means; and
   - a phase meter connected to said reference signal source means and to said coincidence means for producing an unambiguous indication of the direction of said signal source.

2. In a radio interferometer system as set forth in claim 1 wherein a recorder and a computer are connected to said phase meter.

3. In a radio interferometer system as set forth in claim 1 wherein said coincidence means includes an "AND" gate.

4. In a radio interferometer system as set forth in claim 3 wherein a pre-amplifier and an IF detection circuit are connected in series with each mixer.

5. In a space surveillance system wherein a narrow fence of electromagnetic energy is radiated, apparatus for providing an unambiguous indication of the direction of a reflecting satellite penetrating said fence comprising:
   - a plurality of antenna pairs, each pair having a different baseline distance, for receiving electromagnetic energy reflected by said satellite;
   - a plurality of signal channels, each channel being connected to a different antenna pair and comprising:
     - two mixers, each coupled to a different antenna of said pair;
     - two phase coherent oscillators connected to said mixers and producing signals that are separated in frequency by a frequency difference which is substantially proportional to the baseline distance between said antenna pair;
     - an adder coupled to receive the output of said two mixers; and
     - a detector connected to said adder to produce an output signal related in phase to energy received by said antennas and in frequency to the frequency difference between said oscillator signals;

coincidence means connected to the output of said detectors in said plurality of channels for producing a signal when said outputs of said detectors achieve a selected phase relationship;

reference signal source means; and a phase meter connected to said reference signal source means and to said coincidence means for producing an unambiguous indication of the direction of said satellite.

6. Apparatus as set forth in claim 5 wherein a recorder and a computer are connected to said phase meter.

7. Apparatus as set forth in claim 5 wherein said coincidence means includes an "AND" gate.

8. Apparatus as set forth in claim 7 wherein a preamplifier and an IF detection circuit are connected in series with each mixer.

References Cited by the Examiner

UNITED STATES PATENTS

| | | | |
|---|---|---|---|
| 3,217,326 | 11/1965 | Kaufman et al. ------ | 343—113 |
| 3,249,943 | 5/1966 | Kaufman ----------- | 343—113 |

CHESTER L. JUSTUS, *Primary Examiner.*

D. C. KAUFMAN, *Assistant Examiner.*